(12) United States Patent
Bonekamp et al.

(10) Patent No.: US 8,568,518 B2
(45) Date of Patent: Oct. 29, 2013

(54) METHOD OF MAKING SAPO-34 MEMBRANES FOR USE IN GAS SEPARATIONS

(75) Inventors: Benedictus Clemens Bonekamp, LE Petten (NL); Hendrik Jan Marsman, LE Petten (NL); Johannis Pieter Overbeek, LE Petten (NL); Paul Jason Williams, Richmond, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 13/581,888

(22) PCT Filed: Mar. 3, 2011

(86) PCT No.: PCT/US2011/026997
§ 371 (c)(1),
(2), (4) Date: Aug. 30, 2012

(87) PCT Pub. No.: WO2011/109601
PCT Pub. Date: Sep. 9, 2011

(65) Prior Publication Data
US 2013/0008312 A1   Jan. 10, 2013

Related U.S. Application Data

(60) Provisional application No. 61/310,491, filed on Mar. 4, 2010.

(51) Int. Cl.
*B01D 53/22* (2006.01)
(52) U.S. Cl.
USPC ............... 96/11; 95/43; 95/45; 96/4; 96/7; 96/10

(58) Field of Classification Search
USPC ............... 95/43, 45; 96/4, 7, 10, 11
See application file for complete search history.

(56) References Cited

U.S. PATENT DOCUMENTS

| | | | |
|---|---|---|---|
| 5,429,743 A * | 7/1995 | Geus et al. | 210/490 |
| 5,716,527 A * | 2/1998 | Deckman et al. | 210/651 |
| 6,241,960 B1 | 6/2001 | Topsoe et al. | 423/700 |
| 6,503,294 B2 * | 1/2003 | Yoshikawa et al. | 95/45 |
| 7,316,727 B2 | 1/2008 | Falconer et al. | 95/51 |
| 2001/0020416 A1 * | 9/2001 | Yoshikawa et al. | 95/45 |
| 2004/0033180 A1 * | 2/2004 | Matsukata et al. | 422/209 |
| 2005/0003956 A1 | 1/2005 | Fuglerud et al. | 502/214 |
| 2007/0137485 A1 * | 6/2007 | Bitterlich et al. | 96/11 |
| 2007/0265484 A1 | 11/2007 | Li et al. | 585/818 |
| 2008/0047427 A1 * | 2/2008 | Bitterlich et al. | 95/45 |
| 2008/0134895 A1 | 6/2008 | Ruud et al. | 96/9 |
| 2008/0216650 A1 | 9/2008 | Falconer et al. | 95/51 |
| 2008/0220159 A1 | 9/2008 | Jonsson et al. | 427/163.2 |

OTHER PUBLICATIONS

Posthusta, et al.; "Separation of Light Gas Mixtures Using SAPO-34 Membranes"; AIChE Journal 4 (46) pp. 778-789; Apr. 2000.

* cited by examiner

*Primary Examiner* — Jason M Greene
*Assistant Examiner* — Anthony Shumate
(74) *Attorney, Agent, or Firm* — Charles W. Stewart

(57) ABSTRACT

A method of making a crystalline silicoaluminophosphate-34 (SAPO-34) membrane. The method comprises the steps of providing a porous support having a pore size distribution such that a small proportion of its pores are larger than 10 microns, seeding the porous support with SAPO-34 seed crystals by capillary suspension infiltration to give a seeded support, and growing a SAPO-34 membrane layer on the surface of the seeded support.

14 Claims, 1 Drawing Sheet

METHOD OF MAKING SAPO-34 MEMBRANES FOR USE IN GAS SEPARATIONS

RELATED CASES

The present application claims priority from PCT/US2011/026997, filed 3 Mar. 2011, which claims priority from U.S. provisional application 61/310,491, filed 4 Mar. 2010, which are both incorporated herein by reference.

FIELD OF THE INVENTION

The present invention relates to a method for making silicoaluminophosphate (SAPO) membranes.

BACKGROUND OF THE INVENTION

A silicoaluminophosphate, also referred to herein as SAPO, are largely composed of silicon, aluminum, phosphorus and oxygen and may have a 3-dimensional microporous crystal framework structure of $PO_2^+$, $AlO_2^-$ and $SiO_2$ tetrahedral units. The cages, channels and cavities created by the crystal framework of these materials permit their use in applications for the separation of mixtures of molecules based on their effective sizes.

SAPO membranes are known to be useful in gas separations. U.S. Published Application 2007/0265484 describes a method for making SAPO-34 membranes on porous supports. These membranes may be used for the separation of carbon dioxide and methane. The method involves applying a limited quantity of SAPO-34 crystalline material to at least part of the surface of a porous support in the form of loose crystals and then rubbing them onto and/or into the surface for the purpose of "seeding" the surface with SAPO-34 crystals in preparation for membrane growth. A continuous SAPO-34 membrane layer is then grown on the surface using the secondary growth technique. In secondary growth, an aqueous SAPO-34 forming gel comprising of silicon, aluminum, phosphorus, oxygen and organic templating agent(s) is prepared and the porous support is contacted with this gel. Next, the porous support and the gel are heated to form a thin layer of SAPO-34 crystalline material on the support. Finally, the supported SAPO layer is calcined to remove the templating agent(s). U.S. Published Application 2007/0265484 is herein incorporated by reference in its entirety.

The crystals that are added to the surface of the support are believed to act as crystallization nuclei for the synthesis mixture of SAPO-34 gel during hydrothermal treatment. Crystals that act as crystallization nuclei may be referred to as "seed crystals". The crystals applied to the support may be referred to generally as seed crystals even though every single crystal applied to the support need not act as a nucleus for subsequent crystallization. During membrane synthesis, growth of the seed crystals, nucleation of new crystals on the seed crystals, and even complete dissolving of the seed crystals may occur.

The process for seeding by rubbing the seed crystals onto and/or into the support does produce functional membranes but this process is difficult to apply on a large and commercial scale. Thus, it would be advantageous if a new seeding method could be found that can be scaled up to a commercial scale operation while still providing the same or better functional membranes with good selectivity for carbon dioxide over methane and good carbon dioxide permeance.

SUMMARY OF THE INVENTION

One aspect of the invention provides an advantageous method for the preparation of a crystalline silicoaluminophosphate-34 (SAPO-34) membrane. The method comprises the steps of:

(a) providing a porous support having a surface and a pore size distribution such that a small proportion of the pores of the porous support have a pore diameter larger than 10 microns;

(b) seeding the porous support with SAPO-34 seed crystals to provide a seeded support by capillary suspension infiltration, which comprises the steps of: making a stable seed crystal suspension, which comprises SAPO-34 particles at a concentration in the range of from 0.01 to 10 wt % of the stable seed crystal suspension, wherein the SAPO-34 particles within the stable seed crystal suspension have characteristics such that the ratio of an average particle size of the SAPO-34 particles contained within the stable seed crystal suspension to an average pore diameter of the pores of the porous support is no more than 1, and contacting the surface of the porous support with the stable seed crystal suspension for a period of at least 1 second; and (c) growing a SAPO-34 membrane layer on the surface of the seeded support using secondary growth crystallization.

DETAILED DESCRIPTION OF THE INVENTION

Figure 1:
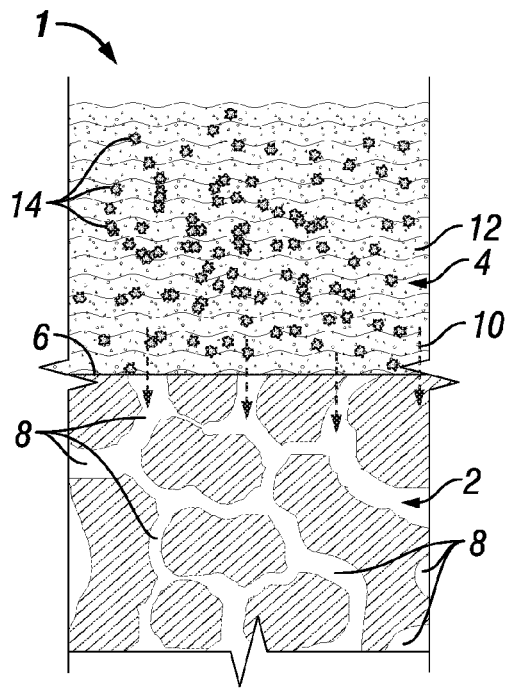
FIG. 1 is a schematic depiction of a porous support and a stable seed crystal suspension at the instant in time at which the stable seed crystal suspension is first applied to or contacted with the surface of the porous support.

The capillary suspension infiltration procedure uses capillary forces to transport a stable seed crystal suspension into and onto the pores of a porous support to thereby introduce seed crystals upon the surface of the porous support and into its pores. In this procedure, an aqueous suspension of SAPO particles or seed crystals is formed and then applied to the side or surface of the porous support that is to be seeded. The pH of the stable seed crystal suspension is controlled so as to optimize the attraction between the porous support and seed crystals and to minimize the particle-to-particle attraction, i.e., to prevent the agglomeration of the SAPO-34 particles that are suspended within the stable seed crystal suspension.

Capillary forces are used to pull the stable seed crystal suspension into the pores of the porous support. The seed crystals enter the pores and are filtered based mainly on the size of the SAPO particles of the stable seed crystal suspension relative to the size of the pores of the porous support. Therefore, a feature of the inventive method includes the use in the capillary suspension infiltration procedure of a stable seed crystal suspension that has a characteristic such that the SAPO particles therein have an average particle size that falls within the range of from 0.001 μm (1 nm) to 50 μm (50,000 nm). It is preferred for the average particle size of the SAPO particles of the stable seed crystal suspension to be in the range of from 0.002 μm (2 nm) to 10 μm (10,000 nm), and, most preferred, they are from 0.005 μm (5 nm) to 7.5 μm (7,500 nm).

The term "particle size," as used herein in reference to the SAPO particles or seed crystals, means the maximum dimension of a particle. The particle dimension may be determined by those skilled in the art by using accepted, standard Scanning Electron Microscopy (SEM) techniques for measuring the sizes of microscopic particles and crystals. The average particle size of a population of particles may be determined by the use of standard sampling, measurement and computational methods generally acceptable to those skilled in the art that can be used to characterize a population of particles.

It is a significant and important feature of the inventive method for the SAPO particles of stable seed crystal suspension that is applied to the surface of the porous support to have a particle size distribution such that the ratio of the average particle size of the SAPO particles within the stable seed crystal suspension to the average pore diameter of the pores of the porous support (as later defined herein) is no more than 1 or less than 1. This ratio of average particle size-to-average pore diameter (Ratio=ave. particle size/ave. pore diameter) is preferably in the range of from 0.01 to 0.9, more preferably, in the range of from 0.02 to 0.75, and, most preferably, from 0.05 to 0.5.

The amount of deposited particles on the surface of the support after capillary suspension infiltration may depend upon such factors as the particle concentration in the stable seed crystal suspension, the capillary suction speed, the suction capacity of the porous support, the particle size distribution in the stable seed crystal suspension, the interaction forces between the SAPO particles and particle substrate, the pore size distribution of the pores of the porous support, and the time period at which the surface of the porous support is contacted with the stable seed crystal suspension.

The capillary suction speed and the suction capacity are characteristics of the support material and are influenced by the wettability of the liquid on the support material.

Wetting is the ability of a liquid to maintain contact with a solid surface resulting from intermolecular interactions when the two are brought together. The degree of wetting (wettability) is determined by force balance between adhesive and cohesive forces. Wetting and the surface forces that control wetting in combination with the pore size are responsible for capillary effects.

The porous support of the invention may include any porous material that is suitable for use as a support for a layer of SAPO-34 particles that can form a membrane layer. The porous support may be of any shape or geometry; provided, that, it has a surface that permits the application thereto of the layer of SAPO-34 crystals to thereby form a membrane layer. Such shapes can include planar or curvilinear sheets of the porous material, or the shapes can be tubular, such as, for example, rectangular, square and circular tubular shapes all of which should have at least one surface to which the membrane layer may suitably be applied.

The porous support may be made of or comprise porous material selected from any materials known to those skilled in the art, including, but not limited to, inorganic porous materials, such as, α-alumina, γ-alumina, glass, titania, zirconia, carbon, silicon carbide, clays or silicate materials, aerogels, supported aerogels, and supported silica, titania, and zirconia.

In one embodiment of the invention, the porous support can comprise a porous ceramic material and, further, this porous ceramic material may have a surface layer of the same or a different ceramic material. Suitable types of ceramic materials for this embodiment may include those selected from the group consisting of alpha-alumina, titania and zirconia. One of the preferred materials for use as the porous support includes porous or macroporous alpha-alumina. Thus, the porous support can comprise a porous or macroporous alpha-alumina, which, further, can comprise a surface layer comprising a ceramic selected from the group consisting of alumina, titania, and zirconia.

The porous support may also comprise a porous stainless steel. Examples of possible suitable stainless steels, include, for example, the 301, 304, 305, 316, 317, and 321 series of stainless steels, the twenty or more HASTELLOY® alloys, for example, HASTELLOY® B-2, C-4, C-22, C-276, G-30, X and others, and the INCONEL® alloys, for example, INCONEL® alloy 600, 625, 690, and 718.

The porosity of the material of the porous support can be in the range of from 0.01 to 1. The term "porosity" is defined herein as the proportion of non-solid volume to the total volume (i.e., non-solid and solid) of the porous material. A more typical porosity is in the range of from 0.05 to 0.8, and, even, from 0.1 to 0.6.

The pore size distribution of the pores of the porous support can vary with the average pore diameter of the pores of the porous support typically being in the range of from range of from 0.001 µm (1 nm) to 50 µm (50,000 nm). More typically, the average pore diameter of the porous support is in the range of from 0.002 µm (2 nm) to 10 µm (10,000 nm), and, most typically, it is from 0.005 µm (5 nm) to 7.5 µm (7,500 nm).

The porous support should have a pore size distribution such that a small proportion of its pores have pore diameters larger than 10 microns. When too many of the pores are larger than 10 microns, then the selectivity of the final membrane suffers. While not wishing to be bound by any particular theory, it is nevertheless theorized that this is caused by an inability to form a continuous layer of molecular sieve crystalline material over the large diameter pores of the porous support. The continuous layer formed on the surface of the porous support, after homogenous nucleation and growth, is due to the close packing caused by a distribution of crystal sizes formed during secondary growth crystallization.

When a significant proportion of the pores of the porous support have a pore diameter larger than 10 microns it becomes difficult to completely cover the pores of the porous support by a continuous layer of the SAPO-34 crystalline material thereby leading to the preparation of a final membrane having defects and low selectivity characteristics.

Thus, it is desirable for the proportion of the total pore volume of the pores of the porous support that have a pore diameter of greater than 10 microns to be less than about 5% of the total pore volume of the porous support. It is preferred that less than 3% of the total pore volume of the porous support to be contained within its pores that have pore diameters of greater than 10 microns, and, more preferred, this value is less than 2% of the total pore volume, and, most preferred, this value is less than 1% of the total pore volume.

It is preferred for the suspension of SAPO-34 seed crystals be relatively stable. The particles in the suspension should not precipitate and agglomerate during the seeding procedure. The stability of a colloidal suspension against aggregation is related to the tendency of the particles to aggregate or to resist aggregation. The electokinetic charge in the suspension between the particles and the suspending material can significantly impact the stability of the suspension against aggregation.

The Zeta potential is widely used by those skilled in the art for the quantification of the magnitude of the electrokinetic charge of a particle in the suspension. Zeta potential is the potential difference between the dispersion medium and the shear plane (i.e. boundary of stationary layer of fluid which is attached to the dispersed particle) and the flowing liquid. In case of electrostatic particle stabilization the zeta potential indicates the degree of repulsion between adjacent, similarly charged particles in a dispersion. A high value for the zeta potential will then indicate electrostatic stability, i.e., the solution or dispersion or suspension will resist aggregation. When the zeta potential is low, attraction exceeds repulsion and the dispersion is unstable and coagulates. Generally, a zeta potential of from + or −30 to + or −40 mVolt is considered to indicate moderate stability.

Usually the most important factor that affects zeta potential of a particle in the suspension is pH; but, in the case of specific adsorption of ions, the ion concentration can determine the zeta potential to a large extent. Thus, the zeta potential value should be coupled with a definition of its environment, including: pH, ionic strength and ionic species, concentration of any additives, etc. For instance, if more base is added to a suspension, then particles tend to acquire a more negative charge. If acid is added to the suspension, eventually, the charge will become zero (but not necessarily the electrokinetic charge). Further addition of acid will cause a buildup of a positive net charge.

In general, the zeta potential versus pH curve will be positive at low pH and lower or negative at high pH in the absence of strong specific adsorption. There may be a point when the curve passes through a point where the zeta potential is 0, which is called the iso-electric point (the electrokinetic charge is then zero too, but the overall surface charge due to charged groups or the surface crystal structure may still be larger or smaller than zero). This is normally the point where the suspension is least stable if electrostatic stabilization is the main stabilization mechanism.

The stable seed crystal suspension used in the capillary suspension infiltration procedure, generally, should have a pH in the range of from 1 to 12. But, it is preferred for the pH of the stable seed crystal suspension to be maintained to within a narrower pH range of from 2 to 10. It is more preferred for the pH of the stable seed crystal suspension to be in the range of from 3 to 9, and, most preferred, it is in the range of from 4 to 8.

It may also be advantageous to use sonication to aid in the de-aggregation and dispersion of SAPO particles in the stable seed crystal suspension.

The concentration of the SAPO-34 particles or seed crystals in the stable seed crystal suspension also influences the degree to which the capillary suspension infiltration procedure is successful. In one embodiment of the invention, it is desirable for the concentration of the SAPO-34 particles or seed crystals contained in the stable seed crystal suspension to be in the range of from about 0.01 to about 10 wt %. It is preferred, however, for the concentration of SAPO-34 particles contained in the stable seed crystal suspension to be in the range of from 0.05 to 2 wt % of the stable seed crystal suspension, and, more preferred, the concentration is in the range of 0.1 to 1 wt %.

The wt % of the SAPO-34 particles or seed crystals contained in the stable seed crystal suspension is based on the total weight of the SAPO-34 crystals relative to the total weight of the stable seed crystal suspension. The concentration of the seed crystals in the suspension and the zeta potential of the particles in the suspension are influenced by the choice of the suspension medium and additives.

In the absence of stabilizing additives as surfactants or polymers, the zeta potential of the stable seed crystal suspension in combination with the surface charge of the porous support that is contacted with the stable seed crystal suspension determines the attraction or repulsion forces between the two. In a preferred embodiment of the invention, the SAPO-34 particles and the porous support do not repel each other strongly. Thus, particles are collected on the surface of the porous support during the filtration process that is induced by the capillary (or other) forces, resulting in pore clogging by the particles, but, preferably, no layer is formed.

The suspension medium of the stable seed crystal suspension generally includes a predominant proportion that is water. The suspension medium further may comprise a pH modifier used to control the pH of the stable seed crystal suspension as earlier described herein. Any suitable pH modifier known to those skilled in the art may be used and can include the compounds selected from the group consisting of ammonium nitrate, ammonium hydroxide, and nitric acid. Viscosity modifiers may also be included in the suspension medium of the stable seed crystal suspension. One particular advantageous viscosity modifier includes polyethylene glycol (PEG).

To provide a seeded support upon which a membrane layer is grown, the capillary suspension infiltration procedure, as described above, is utilized. The porous support is seeded by applying to or contacting its surface with the stable seed crystal suspension for a period of time that is sufficient to provide a satisfactorily seeded support.

The time period for which the surface of the porous support is contacted with the stable seed crystal suspension is generally at least 1 second or at least 10 seconds. A preferred time for contacting the porous support with the stable seed crystal suspension is in the range of from 1 to 200 seconds, and, more preferred, the contacting time is in the range of from 10 to 100 seconds. It is recognized that a too short of a contacting time can result in an insufficient amount of seeding of the surface of the porous support and a too long of a contacting time can result in an excessive and undesirable amount of seeding of the surface of the porous support.

The membrane layer may be grown on the support using typical secondary growth crystallization procedures known to those who practice the art.

U.S. Pat. No. 7,316,727, which is herein incorporated by reference in its entirety, describes high-selectivity supported SAPO membranes and methods for their preparation and use using secondary growth crystallization. The SAPO membranes are prepared by contacting at least one surface of a porous membrane support with an aged synthesis gel, which is comprised of SAPO precursors and a templating agent. After the gel is applied, the support and the gel are heated. A layer of SAPO crystals is formed on at least one surface of the support. SAPO crystals may also form in the pores of the support. Finally, the SAPO layer is calcined to remove the templating agent. The SAPO-34 membranes can have improved selectivity for certain gas mixtures, including mixtures of carbon dioxide and methane.

In US published patent application no. 2007/0265484, which is herein incorporated by reference in its entirety, high flux and high selectivity SAPO-34 membranes are prepared by contacting at least one surface of a porous membrane support with a synthesis gel as described above. The gel is comprised of an aluminum source, a phosphorus source, a silicon source, templating agent(s) and water. The Si/Al ratio of the synthesis gel can be from 0.1 to 0.6. The gel is heated to a temperature of from 453 to 533° K. A layer of SAPO-34 crystals is formed on at least one surface of the support.

In US published patent application no. 2008/0216650, which is herein incorporated by reference in its entirety, SAPO-34 membranes are prepared by contacting at least one surface of a porous membrane support with a synthesis gel comprising a first and a second templating agent. SAPO-34 crystals having a narrow size distribution were applied to the surface of the support prior to synthesis. A layer of SAPO-34 crystals was formed on at least one surface of the support.

Posthusta, et al, Separation of Light Gas Mixtures Using SAPO-34 Membranes; April, 2000, AlChE Journal 4 (46) 770-789 reports another preparation of SAPO-34 synthesis gel and application to a substrate to make a supported membrane.

The SAPO-34 membrane prepared by the methods described herein may be used in the manner and for applications as are described in detail in the aforementioned patents and patent publications that are incorporated herein by reference.

Reference is now made to the FIG.s which are provided to illustrate certain aspects or features of the inventive method.

FIG. 1:

Presented in FIG. 1 is a schematic depiction of an enlarged cross section 1 of a microscopic portion of the porous support 2 and the stable seed crystal suspension 4 at the immediate instant in time when the stable seed crystal suspension 4 is applied to the surface 6 of the porous support 2. This instant in time is before the stable seed crystal suspension 4 has been contacted with the surface 6 for a sufficient period of time so as to allow it to be pulled into the pores 8 by capillary action.

The arrows 10 indicate the direction of flow of the stable seed crystal suspension 4 into the pores 8. The stable seed crystal suspension 4 includes a suspension medium 12 (shown by the shaded areas) in which is contained the SAPO-34 particles or seed crystals 14 (shown as particles).

Figure 2:
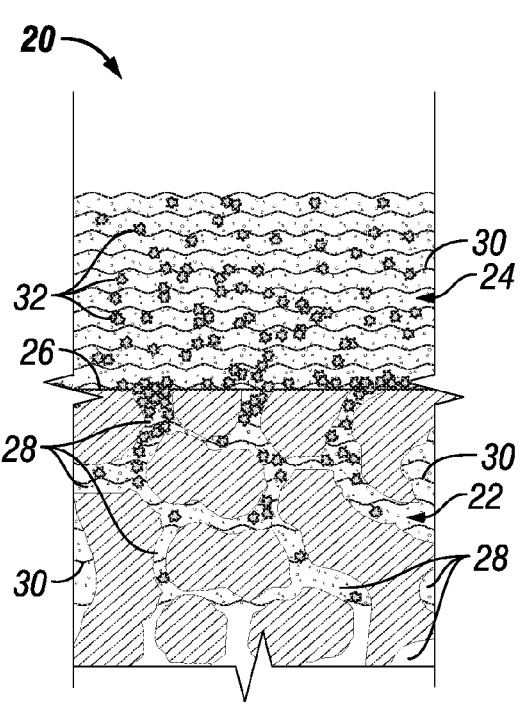
FIG. 2 is a schematic depiction of the porous support and stable seed crystal suspension after a period of time of which the surface of the porous support has been contacted with the stable seed crystal suspension.

FIG. 2:

Presented in FIG. 2 is a schematic depiction of an enlarged cross section 20 of a microscopic portion of the porous support 22 and the stable seed crystal suspension 24 after a contacting time period at which the surface 26 of the porous support 22 has been contacted with the stable seed crystal suspension 24.

As depicted in FIG. 2, the porous support 22 has been contacted with the stable seed crystal suspension 24 for a sufficient period of time so as to allow it to be drawn into the pores 28 of the porous support 22 by capillary action. The stable seed crystal suspension 24 includes a suspension medium 30 (shown by the shaded areas) in which is contained the SAPO-34 particles or seed crystals 32 (shown as particles).

As is depicted in FIG. 2, the suspension medium 30 penetrates a significant depth and fills a significant portion of the pores 28 of the porous support 22. By drawing the stable seed crystal suspension 24 into the pores 28 of the porous support 22, the SAPO-34 particles 32 are also pulled into the pores 28. This is shown by the concentration of SAPO-34 particles that are accumulated around the surface 26 of the porous support 22 and the dispersion of SAPO-34 particles at further depths within the pores 28. This provides a seeded support upon which surface a SAPO-34 membrane layer may be grown using secondary growth crystallization procedures or methods as are described in the patents and patent publications summarized above and incorporated herein by reference.

EXAMPLES

The following describes an example of the present invention

Preparation of Suspension 0.080 g $NH_4NO_3$ was added to 980 g water. Poly(ethylene glycol), PEG (approx. MW 100,000), was also added to this mixture in a concentration of from 0 to 2 weight percent. The resulting solution had a concentration 0.1 M % $NH_4NO_3$ and 0-2 wt. % PEG. SAPO-34 seed crystals synthesized as described in US patent application publication 2008/0216650 were added to the solution to make a suspension having a concentration of SAPO-34 particles in the range of 0.1-1.0 weight %. The suspension was mixed using an ultrasonic bath. $NH_4OH$ was added as needed to set the pH to 7.

Seeding by Capillary Suspension Infiltration

Tubular porous —$Al_2O_3$ supports were obtained from TAMI Industries with a length of 25 cm. These supports have an average pore size of about 4 microns and very few pores larger than 5 microns. The supports were washed with ethanol and dried at 70° C. for two hours before use. The seed suspension was first mixed using an ultrasonic bath for at least 15 minutes. The support was sealed on one end and placed in a vessel containing the seed suspension for 10 or 100 seconds. The supports were then dried at 110° C. for two hours.

Formation of Membrane by Secondary Growth

Deionized water and 85 wt % phosphoric acid were mixed and heated to 50° C. To this solution, 99 wt % aluminum isopropoxide was added and stirred for 3 hours. LUDOX AS40 was then added and stirred for 3 hours while maintaining the temperature at 50° C. Finally, tetraethylammonium hydroxide and dipropylamine were added. This gel solution was aged at 50° C. for 3 days under stirring. After aging, the gel was added along with the seeded support to a sealed autoclave and subjected to hydrothermal treatment in an oven at 220° C. for 24 hours. The autoclave was then removed from the oven, the support removed, the gel replaced by a new gel and the support inverted in this new gel solution before returning it to the oven for another 24 hours at 220° C., thus completing the hydrothermal treatment. The membrane was subsequently removed from the autoclave and rinsed clean, then dried at 70° C. Finally, the membrane was calcined at 400° C. for 8 hours using a ramp rate of +0.8° C./min.

Performance of Membranes $CO_2/CH_4$ mixture permeations were measured by the use of an experimental gas separation and gas flow measurement system. First, the porous membranes were sealed at each end using a non-permeable coating thereby forming a non-porous section on each end. A membrane was mounted in a stainless steel module and sealed at each end with graphite o-rings. The pressure on each side of the membrane was independently controlled. The feed and permeate pressures were 250 kPa and 100 kPa, respectively. The feed gas composition was 50% $CO_2$ and 50% $CH_4$. The flux of each gas through the membrane was measured using a flow meter. The compositions of the feed, retentate and permeate were analyzed with a gas chromatograph.

The selectivity presented in Table 1 is given as a ratio of the permeance of $CO_2$ to $CH_4$. Table 1 presents the performance of four membranes made using different concentrations of seeds and PEG and different infiltration times on an alumina support.

Table 2 lists the performance of three membranes made using different concentrations of seeds and PEG and different infiltration times on a stainless steel support.

TABLE 1

Performance of alumina supported membranes made using capillary suspension infiltration seeding method

| Membrane name | Wt % SAPO-34 crystals | Wt % PEG | Time in contact with support (s) | $CO_2$ permeance ($10^{-7}$ mol/m$^2$-s-Pa) | $CO_2$ permeance/ $CH_4$ permeance |
|---|---|---|---|---|---|
| 14 TAMI-01 | 0.1 | 2 | 100 | 1.4 | 590 |

TABLE 1-continued

Performance of alumina supported membranes made using capillary suspension infiltration seeding method

| Membrane name | Wt % SAPO-34 crystals | Wt % PEG | Time in contact with support (s) | $CO_2$ permeance ($10^{-7}$ mol/m$^2$-s-Pa) | $CO_2$ permeance/ $CH_4$ permeance |
|---|---|---|---|---|---|
| 14 TAMI-02 | 1.0 | 0 | 10 | 1.0 | 130 |
| 14 TAMI-03 | 0.1 | 0 | 10 | 1.6 | 170 |
| 14 TAMI-04 | 1.0 | 2 | 100 | 1.0 | 90 |

TABLE 2

Performance of stainless steel supported membranes made using capillary suspension infiltration seeding method

| Membrane name | Wt % SAPO-34 crystals | Wt % PEG | Time in contact with support (s) | $CO_2$ permeance ($10^{-7}$ mol/m$^2$-s-Pa) | $CO_2$ permeance/ $CH_4$ permeance |
|---|---|---|---|---|---|
| 01 Mott 18L | 0.1 | 2 | 10 | 1.0 | 160 |
| 01 Mott 27L | 1.0 | 2 | 100 | 1.1 | 120 |
| 01 Mott 37L | 1.0 | 0 | 100 | 1.5 | 100 |

What is claimed is:

1. A method for making a crystalline silicoaluminophosphate-34 (SAPO-34) membrane, wherein the method comprises the steps of:
   (a) providing a porous support having a surface and a pore size distribution such that a small proportion of the pores of the porous support have a pore diameter larger than 10 microns;
   (b) seeding the porous support with SAPO-34 seed crystals to provide a seeded support by capillary suspension infiltration, which comprises the steps of: making a stable seed crystal suspension, which comprises SAPO-34 particles at a concentration in the range of from 0.01 to 10 wt % of the stable seed crystal suspension, wherein the SAPO-34 particles within the stable seed crystal suspension have characteristics such that the ratio of an average particle size of the SAPO-34 particles contained within the stable seed crystal suspension to an average pore diameter of the pores of the porous support is no more than 1, and contacting the surface of the porous support with the stable seed crystal suspension for a period of at least 1 second; and
   (c) growing a SAPO-34 membrane layer on the surface of the seeded support using secondary growth crystallization.

2. The method of claim 1, wherein the average pore diameter of the porous support is in the range of from 1 to 10000 nm.

3. The method of claim 2, wherein the porous support comprises a porous ceramic.

4. The method of claim 3, wherein the porous support comprises porous ceramic with a surface layer comprising a ceramic.

5. The method of claim 1, wherein the porous support comprises a ceramic selected from the group consisting of alpha-alumina, titania or zirconia.

6. The method of claim 5, wherein the porous support is comprises macroporous alpha-alumina with a surface layer composed of alumina, titania or zirconia.

7. The method of claim 1, wherein the porous support comprises a porous metal selected from the stainless steels.

8. The method of claim 7, wherein the porous support comprises the porous metal selected from the stainless steels with a surface layer composed of alumina, titania or zirconia.

9. The method of claim 1, wherein the SAPO-34 particles contained in the stable seed crystal suspension have a particle size distribution such that the average particle size falls within the range of from 1 to 6000 nm.

10. The method of claim 9, wherein the stable seed crystal suspension further comprises water, hydroxide pH modifier, and a viscosity modifier.

11. The method of claim 10, wherein the concentration of SAPO-34 particles contained in the stable seed crystal suspension is in the range of from 0.05 to 2 wt %.

12. The method of claim 11, wherein the stable seed crystal suspension has a pH in the range of from 1 to 12.

13. The method of claim 12, wherein the period at which the surface of the porous support is contacted with the stable seed crystal suspension is in the range of from 1 to 200 seconds.

14. A SAPO-34 membrane made by the method for making a crystalline silicoaluminophosphate-34 (SAPO-34) membrane, wherein the method comprises the steps of:
   (a) providing a porous support having a surface and a pore size distribution such that a small proportion of the pores of the porous support have a pore diameter larger than 10 microns;
   (b) seeding the porous support with SAPO-34 seed crystals to provide a seeded support by capillary suspension infiltration, which comprises the steps of: making a stable seed crystal suspension, which comprises SAPO-34 particles at a concentration in the range of from 0.01 to 10 wt % of the stable seed crystal suspension, wherein the SAPO-34 particles within the stable seed crystal suspension have characteristics such that the ratio of an average particle size of the SAPO-34 particles contained within the stable seed crystal suspension to an average pore diameter of the pores of the porous support is no more than 1, and contacting the surface of the porous support with the stable seed crystal suspension for a period of at least 1 second; and
   (c) growing a SAPO-34 membrane layer on the surface of the seeded support using secondary growth crystallization.

* * * * *